United States Patent [19]

Reisch et al.

[11] Patent Number: 5,100,997
[45] Date of Patent: Mar. 31, 1992

[54] PREPARATION OF ELASTOMERS USING HIGH MOLECULAR WEIGHT POLYOLS OR POLYAMINES, SAID POLYOLS PREPARED USING A DOUBLE METAL CYANIDE COMPLEX CATALYST

[75] Inventors: John W. Reisch, Guilford; Maurice C. Raes, Branford, both of Conn.

[73] Assignee: Olin Corporation, Cheshire, Conn.

[21] Appl. No.: 530,040

[22] Filed: May 29, 1990

[51] Int. Cl.$^5$ .................................. C08G 18/28
[52] U.S. Cl. ........................ 528/60; 521/78; 521/163; 521/167; 521/174; 528/61; 528/64; 528/68; 528/76; 528/77; 264/51; 264/328.1; 264/328.6; 264/328.8
[58] Field of Search .............. 521/78, 163, 167, 174; 528/60, 61, 64, 68, 76, 77; 264/51, 328.1, 328.6, 328.8

[56] References Cited

U.S. PATENT DOCUMENTS

| | | | |
|---|---|---|---|
| 3,654,370 | 4/1972 | Yonkey | 260/584 |
| 3,829,505 | 8/1974 | Herold | 260/611 B |
| 3,941,849 | 3/1976 | Herold | 260/607 |
| 4,218,543 | 8/1980 | Weber et al. | 521/51 |
| 4,301,110 | 11/1981 | Cuscurida et al. | 521/133 |
| 4,335,188 | 6/1982 | Igi et al. | 428/458 |
| 4,358,547 | 11/1982 | Cuscurida et al. | 521/127 |
| 4,472,560 | 9/1984 | Kuyper et al. | 526/120 |
| 4,477,589 | 10/1984 | van der Hulst et al. | 502/169 |

*Primary Examiner*—Maurice J. Welsh
*Assistant Examiner*—Rachel Johnson
*Attorney, Agent, or Firm*—Dale Lynn Carlson

[57] ABSTRACT

The present invention relates to a process for preparing polyurethane/polyurea or polyurea elastomers by spray processing or reaction injection molding a reaction mixture comprising an A-side and a B-side, wherein said A-side comprises a polyisocyanate or an isocyanato-terminated polyurethane prepolymer and wherein said B-side comprises a polyol or polyamine plus a chain extender, in order to form a polyurethane/polyurea or polyurea elastomer, said polyol having an equivalent of between about 1,000 and about 20,000, a preferred molecular weight of between about 5,000 and about 30,000 and an end group unsaturation level of no greater than 0.06 milliequivalents per gram of polyol, said polyol being prepared using a double metal cyanide complex catalyst, said polyamine being fabricated by amine-capping said polyol with an amine-containing compound, said chain extender being selected from the group consisting of diol and aromatic diamine chain extenders with the proviso that said B-side contain at least some amount of said polyamine or of said aromatic diamine chain extender.

23 Claims, No Drawings

PREPARATION OF ELASTOMERS USING HIGH MOLECULAR WEIGHT POLYOLS OR POLYAMINES, SAID POLYOLS PREPARED USING A DOUBLE METAL CYANIDE COMPLEX CATALYST

BACKGROUND OF THE INVENTION

The use of double metal cyanide catalysts in the preparation of high molecular weight polyols is well-established in the art. For example, U.S. Pat. No. 3,829,505, assigned to General Tire & Rubber Company, discloses the preparation of high molecular weight diols, triols etc., using these catalysts. The polyols prepared using these catalysts can be fabricated to have a higher molecular weight and a lower amount of end group unsaturation than can be prepared using commonly-used KOH catalysts. The '505 patent discloses that these high molecular weight polyol products are useful in the preparation of nonionic surface active agents, lubricants and coolants, textile sizes, packaging films, as well as in the preparation of solid or flexible polyurethanes by reaction with polyisocyanates.

Typical fast reaction systems for rapidly producing elastomers include spray processing and reaction injection molding. Spray processing is suitably effected by impingment mixing using high pressure, multi-component spray equipment. High pressure proportioning units, coupled with spray or pour guns, are suitably used to produce, for example, spray polyurea elastomers using such high pressure, impingement mixing systems which are commercially available from Gusmer Corporation.

Reaction Injection Molding (RIM) is a well-established technique for producing polyurethanes and polyureas in a process having a very fast cycle time. RIM is suitable for use in the production of a wide variety of elastomers, most notably for automotive components such as automobile components, as generally disclosed, for example, in U.S. Pat. No. 4,218,543. The '543 patent teaches that the use of a select class of amine extenders provides an excellent combination of rapid reactivity, rapid gellation of the product mixture in the mold, and excellent physical properties of the molded product. The polyols described as being useful in the '543 patent are preferably "classical polyether polyols of polyurethane chemistry".

Heretofore, RIM has not been utilized for the production of polyurethane-polyureas or polyureas using polyols prepared using double metal cyanide catalysts to the knowledge of the present inventors.

SUMMARY OF THE INVENTION

In one aspect, the present invention relates to a process for preparing polyurethane/polyurea or polyurea elastomers by spray processing or reaction injection molding a reaction mixture comprising an A-side and a B-side, wherein said A-side comprises a polyisocyanate or an isocyanato-terminated polyurethane prepolymer and wherein said B-side comprises a polyol or polyamine plus a chain extender, in order to form a polyurethane/polyurea or polyurea elastomer, said polyol having an equivalent weight of between about 1,000 and about 20,000 (preferably between about 1,500 and about 5,000), and preferably having a molecular weight of between about 3,000 and about 30,000 (more preferably between 13,000 and 30,000) and an end group unsaturation level of no greater than 0.06 milliequivalents per gram of polyol, said polyol being prepared using a double metal cyanide complex catalyst, said polyamine being fabricated by amine-capping said polyol with an amine-containing compound, said chain extender being selected from the group consisting of diol and aromatic diamine chain extenders with the proviso that said B-side contain at least some amount of said polyamine or of said aromatic diamine chain extender.

In another aspect, the present invention relates to a process for making a polyurethane/polyurea or polyurea-containing elastomer which comprises the steps of:

(a) fabricating a high molecular weight polyol by reacting an alkylene oxide with a polyhydric initiator to provide a polyol having an equivalent weight of between about 1,000 and about 20,000 (preferably between about 1,500 and about 5,000), and a preferred molecular weight of between about 3,000 and about 30,000 (more preferably between 13,000 and 30,000), and an end group unsaturation level of no greater than 0.06 milliequivalents per gram of polyol, said polyol being prepared using a double metal cyanide complex catalyst, and (b) reacting said high molecular weight polyol and a chain extender with a polyisocyanate or an isocyanto-terminated polyurethane prepolymer using spray processing or reaction injection molding in order to fabricate said polyurethane/polyurea or polyurea-containing elastomer, said chain extender being a diol or aromatic diamine with the proviso that if said chain extender is solely a diol then at least a portion of the polyol from step (a) is amine-capped with an amine-containing compound prior to reaction with the polyisocyanate of step (b).

In yet another aspect, the present invention relates to a process for preparing polyurethane/polyurea or polyurea elastomers by spray processing or reaction injection molding a reaction mixture comprising an A-side and a B-side, wherein said A-side comprises a polyisocyanate or an isocyanato-terminated polyurethane prepolymer and wherein said B-side comprises a polyol or polyamine plus a chain extender, in order to form a polyurethane/polyurea or polyurea elastomer, said polyol having a molecular weight of between 13,000 and 30,000 and an end group unsaturation level of no greater than 0.06 milliequivalents per gram of polyol, said polyamine being fabricated by amine-capping said polyol with an amine-containing compound, said chain extender being selected from the group consisting of diol and aromatic diamine chain extenders with the proviso that said B-side contain at least some amount of said polyamine or of said aromatic diamine chain extender.

In still another aspect, the present invention relates to the polyurethane/polyurea elastomer and polyurea elastomer products produced by the above processes and characterized by high thermal degradation resistance.

These and other objects will become apparent from a reading of the following detailed description of the invention.

DETAILED DESCRIPTION OF THE INVENTION

Rapid processing techniques such as spray processing and Reaction Injection Molding (RIM) processing techniques are well-known in the art. Following these procedures, large quantities of two highly reactive starting materials (comprising an "A-side" and a "B-side") are delivered mechanically within a very short time (typically from about 2 to 4 seconds) and mixed at the same time and sprayed or poured (using spray processing) prior to curing, or introduced into a mold (using RIM) in which the mixture is cured, to yield the finished product within a very short time. Indeed, the full cycle time including the demold step can be as little as from 1 to 2 minutes or less.

Using the spray processing or the RIM procedure in accordance with the process of the present invention, a polyol or polyamine plus a chain extender (comprising the so-called "B-side") is reacted with a polyisocyanate (the so-called "A-side") in order to provide a polyurethane/polyurea or polyurea containing both soft segments and hard segments on the molecule as is desired for rapidly processed elastomer products. Whereas in the past it has been generally required to utilize a polyamine with an amine extender as the B-side in order to provide the advantageous thermal properties typically found in a polyurea elastomer, it is an aspect of the present invention that polyurethane/polyureas and polyureas produced in accordance with the present invention will provide superior thermal properties, including low heat sag and high heat distortion temperature, as compared to elastomers prepared using conventional polyols having higher levels of ethylenic unsaturation. Although not wishing to be bound by any particular theory, this advantageous result is believed to be associated with the low amount of ethylenic unsaturation possessed by the high molecular weight polyols and the high molecular weight polyamines utilized in the process of the present invention. Such a low unsaturation is preferably achieved by using double metal cyanide catalyst(s) in the production of the polyol.

In distinct contrast to the production of classical polyols made using KOH catalysts wherein the polyols produced had equivalent weight upper limits of about 2,000, the high molecular weight polyols utilized in the process of the present are made using double metal cyanide complex catalysts and provide an equivalent weight range of between about 1,000 and about 20,000, preferably between about 1,500 and about 5,000. These polyols provide elastomers having advantageous physical properties, particularly thermal degradation resistance, when employed in rapid processing systems in accordance with the present invention.

The spray processing reaction and the RIM reaction are optionally accelerated by employing a catalyst, and the use of a catalyst is preferred when fabricating a polyurethane/polyurea elastomer. Common urethane catalysts are well known in the art and include numerous organometallic compounds as well as amines, e.g., tertiary amines and metal compounds such as lead octoates, mercuric succinates, stannous octoate or dibutyltin dilaurate may be used. Any catalytic amount may be employed; illustratively, such amount varies, depending on the particular catalyst utilized, from about 0.01 to about 1 percent by weight of the polyol or polyamine employed in the reaction mixture. These catalysts should accelerate the polyaddition reaction to such an extent that once the starting components have been mixed the reactive mixture has a flow time (e.g., the capability to flow and hence the time during which the mixture may still be delivered) of less than 5, 10, or 15 seconds, and demolding times of less than 180 seconds, preferably less than 60 seconds.

The polyols utilized in the present invention are typically prepared by condensing an alkylene oxide, or a mixture of alkylene oxides using random or step-wise addition, with a polyhydric initiator or mixture of initiators, in the presence of a double metal cyanide catalyst. Illustrative alkylene oxides include ethylene oxide, propylene oxide, butylene oxide, amylene oxide, aralkylene oxides such as styrene oxide. The most preferred alkylene oxide is propylene oxide or a mixture thereof with ethylene oxide using random or step-wise oxyalkylation.

The polyhydric initiator used in preparing the polyol reactant includes the following and mixtures thereof: the aliphatic triols such as glycerol, propoxylated glycerol adducts, trimethylolpropane, triethylolpropane, trimethylolhexane, and diols such as ethylene glycol, 1,3-propylene glycol, dipropylene glycol, butylene glycols, propoxylated glycol adducts, butane diols, pentane diols, and the like. In addition, monofunctional and higher functionality initiators are useful in the present invention, including, for example, butanol, sucrose, sorbitol, pentaerythritol, and the like.

The alkylene oxide-polyhydric initiator condensation reaction is carried out in the presence of a double metal cyanide catalyst. Without wishing to be bound by any particular theory, it is speculated by the present inventor that unsaturated end groups result in monofunctional species that act as chain stoppers in elastomer formation. In polyol synthesis with KOH catalysis the unsaturation formed increases as a direct function of equivalent weight. Eventually conditions are established wherein further propylene oxide addition fails to increase the molecular weight. In other words the use of alkali catalysts to produce high molecular weight, hydroxy terminated polyoxypropylene ethers results in a substantial loss in hydroxy functionality. With double metal cyanide catalysis much less unsaturation is formed allowing higher equivalent weight polyols to be prepared.

The double metal cyanide complex class catalysts suitable for use and their preparation are described in U.S. Pat. Nos. 4,472,560 and 4,477,589 to Shell Chemical Company and U.S. Pat. Nos. 3,941,849 and 4,335,188 to General Tire & Rubber Company. The teachings of the foregoing patents are incorporated herein by reference.

One double metal cyanide complex catalyst found particularly suitable for use is a zinc hexacyanometallate of formula:

$$Zn_3[M(CN)_6]_2 \cdot xZnCl_2 \cdot yGLYME \cdot zH_2O$$

wherein M may be Co(III), or Cr(III) or Fe(II) or Fe(III); x, y, and z may be fractional numbers, integers, or zero and vary depending on the exact method of preparation of the complex, but preferably independently range from 0 to 15.

The polyamine that is suitably employed as an alternate active-hydrogen containing compound for reaction with the polyisocyanate under RIM conditions is fabricated by amine-capping the high molecular weight polyol described above. Amine-capping of the polyol is preferably effected by reaction of ammonia in the presence of hydrogen, as disclosed in more detail in U.S. Pat. No. 3,654,370, the disclosure of which is incorporated herein by reference in its entirety. Other conventional amine-capping techniques are also suitably employed, such as, for example, the known procedure of cyanoethylation of the polyol followed by a reduction of the resulting product.

A wide range of polyisocyanates, or isocyanato-terminated polyurethane prepolymers, or mixtures thereof, may be used in the process of the present invention. Preferred polyisocyanates are diphenylmethane diisocyanate ("MDI"), polymethylene polyphenylisocyanate ("PMDI"), paraphenylene diisocyanate, naphthylene diisocyanate, liquid carbodiimide-modified MDI and derivatives thereof, and combinations thereof. Also useful are other polyisocyanates such as toluene diisocyanate ("TDI"), particularly the 2,6-TDI isomer, as well as the various other aromatic polyisocyanates that are well-established in the art, and combinations thereof.

The isocyanato-terminated polyurethane prepolymers particularly suitable for use in the process of the present invention are the MDI prepolymers, such as the prepolymers of MDI a mixture of tripropylene glycol (TPG) and dipropylene glycol (DPG) [commercially available as ISONATE 181], the prepolymers of MDI with 400 to 700 molecular weight diols, the prepolymers of MDI with 4,500 to 6,500 molecular weight triols, as well as the prepolymers of MDI reacted with the high molecular weight polyols utilized in the process of the present invention.

The quantity of polyisocyanate used in the process according to the present invention is preferably calculated so that the foamable mixture has an isocyanate index of from 70 to 130, in particular from 90 to 110. By "isocyanate index" is meant the quotient of the number of isocyanate groups and number of groups which are reactive with isocyanates multiplied by 100.

The chain extenders useful in the process of the present invention are diols or aromatic diamines, or mixtures thereof. Typical diols include ethylene glycol, butane diol, hexane diol, propylene glycol, bisphenol A, or polyalkylene oxide polyols with molecular weights between about 60 and about 500.

Preferred aromatic diamine chain extenders are those which contain at least one alkyl substituent in the ortho-position to a first amino group and two alkyl substituents in the ortho-position to a second amino group or mixtures thereof, preferably with the proviso that at least two of said alkyl substituents contain at least two carbon atoms. Typical aromatic diamine extenders include diethyltoluene diamine, t-butyl toluene diamine, 1-methyl-3,5-diethyl-2,4-diaminobenzene, 1-methyl-3,5-diethyl-2,6-diaminobenzene, 3,5,3',5'-tetraethyl-4,4'-diaminodiphenylmethane, and combinations thereof.

The polyurethane/polyureas and polyureas made in accordance with the present invention are preferably made by RIM or by spray processing methodology. The process according to the present invention is preferably used for producing non-cellular elastomers, although blowing agents may also be used, in which case moldings generally having an integral-skin and a cellular interior are obtained. The blowing agents used may be water and/or readily volatile organic substances and/or dissolved inert gases. Suitable organic blowing agents include, e.g. acetone; ethyl acetate; methanol; ethanol; halogen substituted alkanes, such as methylene chloride, chloroform, ethylidene chloride, vinylidene chloride, monofluorotrichloromethane, chlorodifluoromethane or dichlorodifluoromethane; butane; hexane; heptane; diethyl ether; and the like. Suitable inert gases include nitrogen, air, carbon dioxide, and the like. The effect of a blowing agent may also be obtained by adding compounds which decompose at temperatures above room temperature to liberate gas, for example, nitrogen. Examples include azo compounds, such as azoisobutyric acid nitrile.

The elastomer-forming components may be mixed with conventional optional additives, e.g. dyes, biocides, plasticizers, mold release agents, plasticizers, adhesion promoters, fillers and pigments like mica, glass flakes or glass matts, carbon black, talc, silicones, phthalocyanine blue or green dye, $TiO_2$, U-V absorbers, $MgCO_3$, $CaCO_3$ and the like. The optional additives are suitably employed in the elastomer in an amount of between 0 and about 75 weight percent based upon the weight of the elastomer.

The known reaction injection molding technique (RIM process) is used for carrying out the process according to the present invention. The quantity of reaction mixture (which is optionally foamable) introduced into the mold is chosen so that the molded article generally has a density of from 0.5 to 1.4 g/cc, preferably from 0.9 to 1.1 g/cc.

The initial temperature of the reactants is typically between 10° and 80° C., preferably from 20° to 50° C. The temperature of the mold itself is generally from 40° to 200° C. and preferably from 60° to 130° C.

The known mold release agents based on wax or silicone may be used if desired. Furthermore, when carrying out the process according to the present invention, the internal mold release agents known in the art, may also be used.

The molding obtainable by the process according to the present invention are particularly suitable for the manufacture of flexible car bumpers and car body elements. However, with suitable variation of the starting components and particularly if a relatively low proportion of diamine (c) is used, it is also possible to produce materials which have good abrasion resistance and high mechanical strength e.g. flexible polyurethane shoe soles.

The starting materials mentioned in the following examples are processed in a manner known in the art by means of so called high pressure dosing units. Typically, the components are delivered by special pumps (i.e., BOSCH piston pumps, yielding high pressure of about 100–300 atmospheres) to a hydraulically forced mix head, where they are thoroughly mixed by countercurrent injection (HK-machines from Hennecke or equivalent types of machines which are available from other manufacturers such as KRAUSS-MAFFEI, SIEMAG, CANNON), and these machines may be used as desired. Also useful is the spray processing equipment commercially available from Gusmer Corporation.

As used herein, the term "molecular weight" is intended to designate number average molecular weight, and "equivalent weight" designates the molecular weight of the polyol or polyamine divided by the functionality thereof.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

EXAMPLE 1

Step (A)

Preparation of a High Molecular Weight Polyol With a Double Metal Cyanide Catalyst A propoxylated glycerine precursor (100 g, OH number 168, 0.10 eq.) was added to an autoclave with zinc hexacyanocobaltate glyme complex catalyst ($Zn_3(Co(CN)_6)_2$ glyme) (0.41 g) was added and the mixture was heated to 100° C. Propylene oxide 30 g was added and after the pressure dropped indicating that the catalyst was activated an additional 720 g of propylene oxide was fed into the reactor over a period of 2 hours. The pressure remained low indicating that the propylene oxide was reacting rapidly. After a 30 minute post reaction, KOH (3 g) was added and then ethylene oxide (170 g) was fed into the reactor over a period of two hours and then allowed to react for an additional two hours. Magnesol (20 g) was added and the mixture was heated at 110° C. for one hour and then vacuum stripped for two hours and filtered. The product had an OH number of 17 and an unsaturation level of 0.021 meq/g.

Proposed Step (B)

Amine Capping of a High Molecular Weight Polyol

The amine-capping reaction to produce a high molecular weight polyamine, which is an optional step in the process of the present invention, is carried out in a continuous reactor which is a stainless steel tube of 1¼ inch inside diameter and 27 inches in length. The reactor contains 487 mL of a prereduced, pelleted nickel-copper-chromium catalyst containing 75 mol percent nickel, 23 mol percent copper and 2 mol percent chromium. Into the reactor is metered 160 l. per hour of hydrogen, 0.22 pound per hour of ammonia and 0.84 pound per hour of a 50% solution of the high molecular weight polyol, prepared in Step (A) above, in cyclohexane. The reactor is operated at 250° C. and 3000 p.s.i.g. The reactor effluent is stripped of ammonia and cyclohexane by heating to 150° C. under 5 mm pressure. The product remaining should have approximately 85% of the original hydroxyl groups converted to amino groups.

Proposed Step (C)

Preparation of an Elastomer from a High Molecular Weight Polyol

The starting materials mentioned in the following examples are processed in a manner known in the art by means of high pressure dosing units: the components are delivered by special pumps (i.e. Bosch piston pumps, yielding high pressure of about 100–3200 atmospheres) to a hydrallically forced mix head, where they are thoroughly mixed by counter current injection (e.g. H.K. machines from Hennecke or equivalent machines from Krauss-Maffei, Cannon or Admiral). Also useful is the spray processing equipment commercially available from Gusmer Corporation. The present invention is not intended to be limited to the use of the above-mentioned machines; however, the mixing apparatus used should have a high output capacity (preferably greater than 0.5 Kg/sec) in order to permit the reactive liquid reaction mixture to be introduced into the mold within a short time frame in order to minimize the cycle time for carrying out the RIM process.

137.5 parts by weight of polyether polyol prepared in example 1 having an OH number of 17,12.50 parts by weight of a mixture of 65 parts by weight of 1-methyl-3,5-diethylphenylene-2,4-diamine and 35 parts by weight, of 1-methyl-3,5-diethylphenylene-2,6-diamine; 0.05 parts by weight of a complex of 1 mol of dibutyl tin dilaurate and one mole of 2,3-dimethyl-3,4,5,6-tetrahydropyrimidine are combined to form a polyol component and are injected into a mold with 33.50 parts by weight of a reaction product of tripropylene glycol and 4,4'-diphenylmethane diisocyanate (23% by weight NCO, Mondur PF for example). The temperature of the raw materials is 25° C. and the temperature of the plate mold is 50° C. The setting time in the mold is 30 seconds. The polyurethane/polyurea elastomer obtained is tempered at 120° C. for one hour. The elastomer possesses excellent thermal degradation resistance which is suitably characterized by low heat sag and high heat distortion temperature values.

Proposed Step (D)

Preparation of an Elastomer From High Molecular Weight Polyamine 137.5 parts of amine capped polyol prepared in Step (B) above is combined with 12.50 parts by weight of a mixture of 65 parts by weight of 1-methyl-3,5-diethyl benzene-2,4-diamine and 35 parts by weight of 1-methyl-3,5-diethylphenylene-2,6-diamine. The above polyamine component is injected into a mold with 26.2 g of a carbodiimidized 4,4'-diphenylmethane diisocyanate having an isocyanate content of 29.4% by weight (Isonate 143L or Mondur CD). Processing conditions are the same as those given for Step (C) above. The polyurea elastomer obtained is tempered at 120° C. for one hour. The elastomer possesses excellent thermal degradation resistance which is suitably characterized by low heat sag and high heat distortion temperature values.

What is claimed is:

1. A process for preparing polyurethane/polyurea or polyurea elastomers by spray processing or reaction injection molding a reaction mixture comprising an A-side and a B-side, wherein said A-side comprises a polyisocyanate or an isocyanato-terminated polyurethane prepolymer and wherein said B-side comprises a polyol or polyamine plus a chain extender, in order to form a polyurethane/polyurea or polyurea elastomer, said polyol having an equivalent weight of between about 1,000 and about 20,000 and an end group unsaturation level of no greater than 0.06 milli-equivalents per gram of polyol, said polyol being prepared using a double metal cyanide complex catalyst, said polyamine being fabricated by amine-capping said polyol with an amine-containing compound, said chain extender being selected from the group consisting of diol and aromatic diamine chain extenders with the proviso that said B-side contain at least some amount of said polyamine or of said aromatic diamine chain extender.

2. The process of claim 1 wherein said polyol has an equivalent weight of between 1,500 and 5,000 and a molecular weight of between about 3,000 and about 30,000.

3. The process of claim 1 wherein said A-side or said B-side additionally contains an additive selected from the group consisting of dyes, plasticizers, uv stabilizers, blowing agents, adhesion promoters, fillers and pigments.

4. The process of claim 3 wherein said additive is employed in an amount of between 0 and about 75 weight percent based upon the total weight of the composition.

5. The process of claim 1 wherein said polyol has at least two hydroxyl groups and said polyamine has at least two amino groups.

6. The process of claim 1 wherein said diol is selected from the group consisting of ethylene glycol, butane diol, hexane diol, propylene glycol, bisphenol A, and polyalkylene oxide diols with molecular weights between about 60 and about 500.

7. The process of claim 1 wherein said aromatic diamine contains at least one alkyl substituent in the ortho-position to a first amino group and two alkyl substituents in the ortho-position to a second amino group or mixtures thereof, preferably with the proviso that at least two of said alkyl substituents contain at least two carbon atoms.

8. The process of claim 1 wherein said diamine is selected from the group consisting of diethyltoluene diamine, t-butyl toluene diamine, 1-methyl-3,5-diethyl-2,4-diaminobenzene, 1-methyl-3,5-diethyl-2,6-diaminobenzene, 3,5,3',5'-tetraethyl-4,4'-diaminodiphenylmethane, and combinations thereof.

9. The process of claim 1 wherein said double metal cyanide complex catalyst is a zinc hexacyanometallate of formula:

$$Zn_3[M(CN)_6]_2 \cdot xZnCl_2 \cdot yGLYME \cdot zH_2O$$

wherein M may be Co(III), or Cr(III) or Fe(II) or Fe(III); x, y, and z each have a value of between 0 and 15.

10. The process of claim 1 wherein said polyisocyanate or isocyanato-terminated polyurethane prepolymer is selected from the group consisting of: diphenylmethane diisocyanate, polymethylene polyphenylisocyanate, naphthylene diisocyanate, paraphenylene diisocyanate, liquid carbodiimide-modified MDI and derivatives thereof, prepolymers of MDI with a mixture of tripropylene glycol (TPG) and dipropylene glycol (DPG), the prepolymers of MDI with 400 to 700 molecular weight diols, prepolymers of MDI with 4,500 to 6,500 molecular weight triols, prepolymers of MDI reacted with the high molecular weight polyols made using double metal cyanide catalysis, and combinations thereof.

11. A process for making a polyurethane/polyurea or polyurea-containing elastomer which comprises the steps of:
(a) fabricating a high molecular weight polyol by reacting an alkylene oxide with a polyhydric initiator to provide a polyol having an equivalent weight of between about 1,000 and about 20,000 and an end group unsaturation level of no greater than 0.06 milliequivalents per gram of polyol, said polyol being prepared using a double metal cyanide complex catalyst, and
(b) reacting said high molecular weight polyol and a chain extender with a polyisocyanate or an isocyanto-terminated polyurethane prepolymer using spray processing or reaction injection molding in order to fabricate said polyurethane/polyurea or polyurea-containing elastomer, said chain extender being a diol or aromatic diamine with the proviso that if said chain extender is solely a diol then at least a portion of the polyol from step (a) is amine-capped with an amine-containing compound prior to reaction with the polyisocyanate.

12. The process of claim 11 wherein essentially all of the polyol from step (a) is amine-capped with an amine-containing compound prior to reaction with the polyisocyanate of step (b).

13. The process of claim 11 wherein said polyol has an equivalent weight of between about 1,500 and about 5,000 and a molecular weight of between about 3,000 and about 30,000.

14. The process of claim 11 wherein step (b) is carried out in the presence of an additive selected from the group consisting of dyes, plasticizers, uv stabilizers, blowing agents, adhesion promoters, fillers and pigments.

15. The process of claim 14 wherein said compounding ingredient is employed in an amount of between 0 and about 75 weight percent based upon the total weight of the composition.

16. The process of claim 11 wherein said polyol has at least two hydroxyl groups and said polyamine has at least two amino groups.

17. The process of claim 11 wherein said diol is selected from the group consisting of ethylene glycol, butane diol, hexane diol, propylene glycol, bisphenol A, and polyalkylene oxide diols with molecular weights between 60 and 500.

18. The process of claim 11 wherein said aromatic diamine contains at least one alkyl substituent in the ortho-position to a first amino group and two alkyl substituents in the ortho-position to a second amino group or mixtures thereof, preferably with the proviso that at least two of said alkyl substituents contain at least two carbon atoms.

19. The process of claim 11 wherein said diamine is selected from the group consisting of diethyltoluene diamine, t-butyl toluene diamine, 1-methyl-3,5-diethyl-2,4-diaminobenzene, 1-methyl-3,5-diethyl-2,6-diaminobenzene, 3,5,3',5'-tetraethyl-4,4'-diaminodiphenylmethane, and combinations thereof.

20. The process of claim 11 wherein said double metal cyanide complex catalyst is a zinc hexacyanometallate of formula:

$$Zn_3[M(CN)_6]_2 \cdot xZnCl_2 \cdot yGLYME \cdot zH_2O$$

wherein M may be Co(III), or Cr(III) or Fe(II) or Fe(III); x, y, and z each have a value of between 0 and 15.

21. The process of claim 11 wherein said polyisocyanate or isocyanato-terminated polyurethane prepolymer is selected from the group consisting of: diphenylmethane diisocyanate, polymethylene polyphenylisocyanate, naphthylene diisocyanate, paraphenylene diisocyanate, liquid carbodiimide-modified MDI and derivatives thereof, prepolymers of MDI with a mixture of tripropylene glycol (TPG) and dipropylene glycol (DPG), the prepolymers of MDI with 400 to 700 molecular weight diols, prepolymers of MDI with 4,500 to 6,500 molecular weight triols, prepolymers of MDI reacted with the high molecular weight polyols made using double metal cyanide catalysis, and combinations thereof.

22. The polyurethane/polyurea elastomer or polyurea elastomer product produced by the process of claim 1.

23. The polyurethane/polyurea elastomer or polyurea elastomer product produced by the process of claim 11.

* * * * *